Patented Aug. 5, 1924.

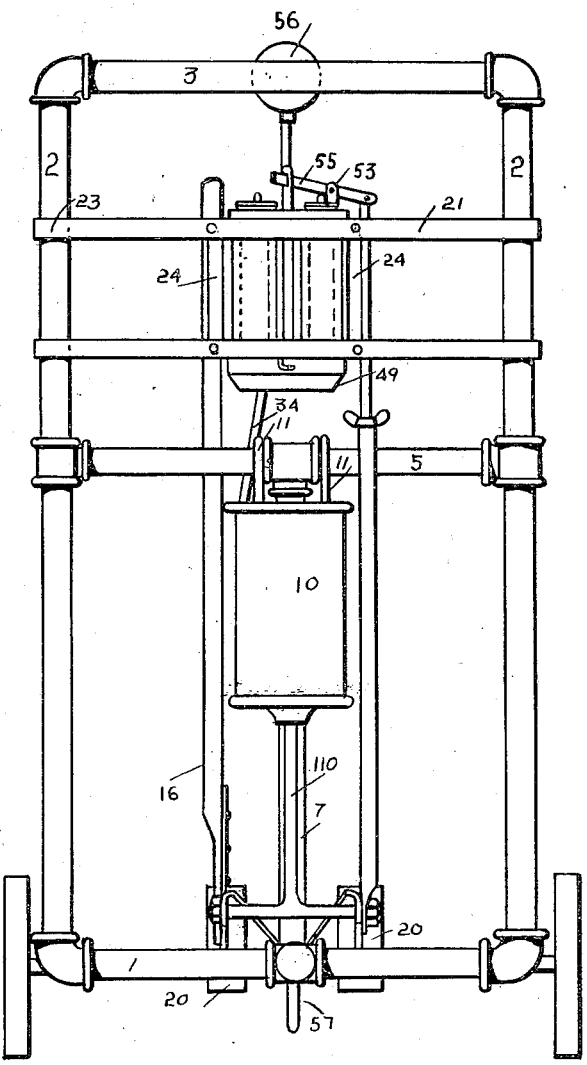

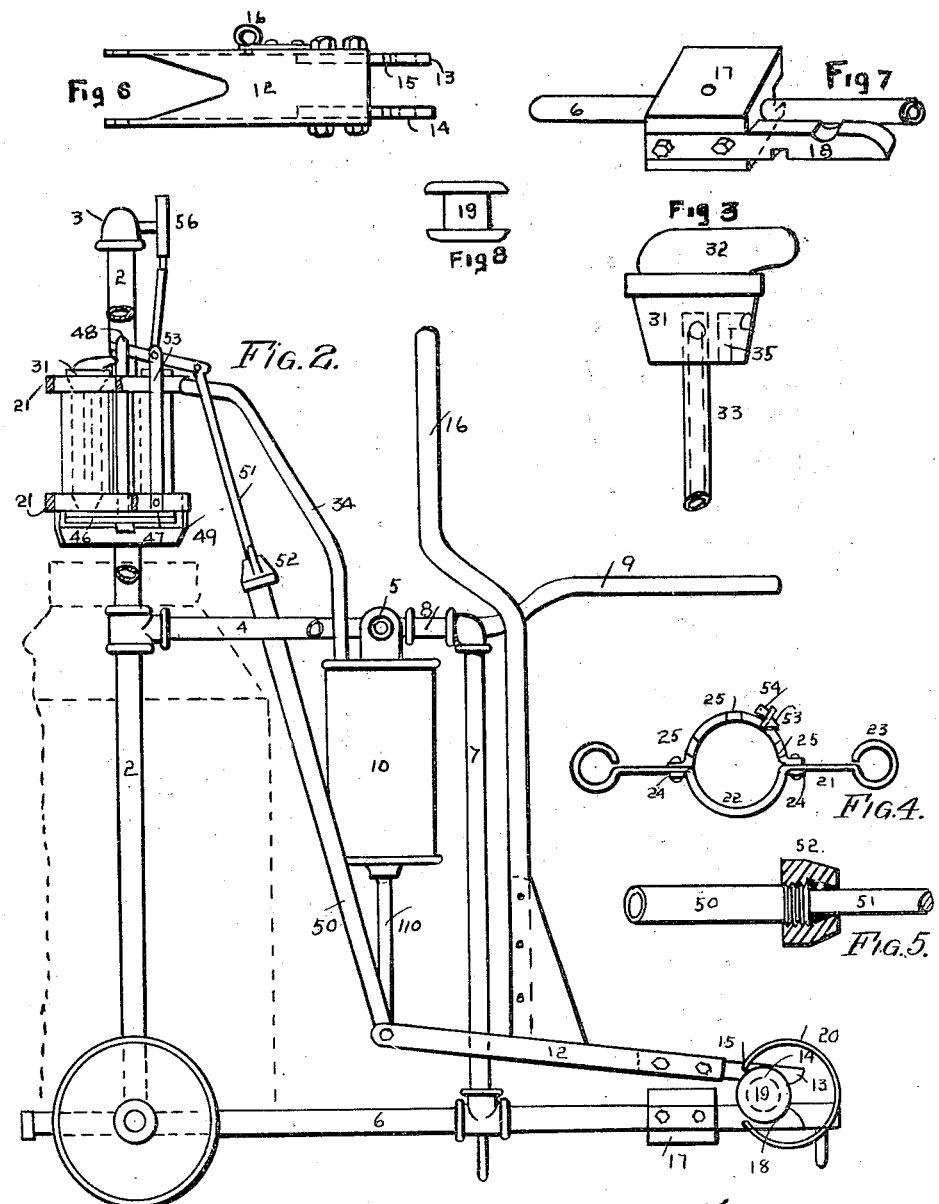

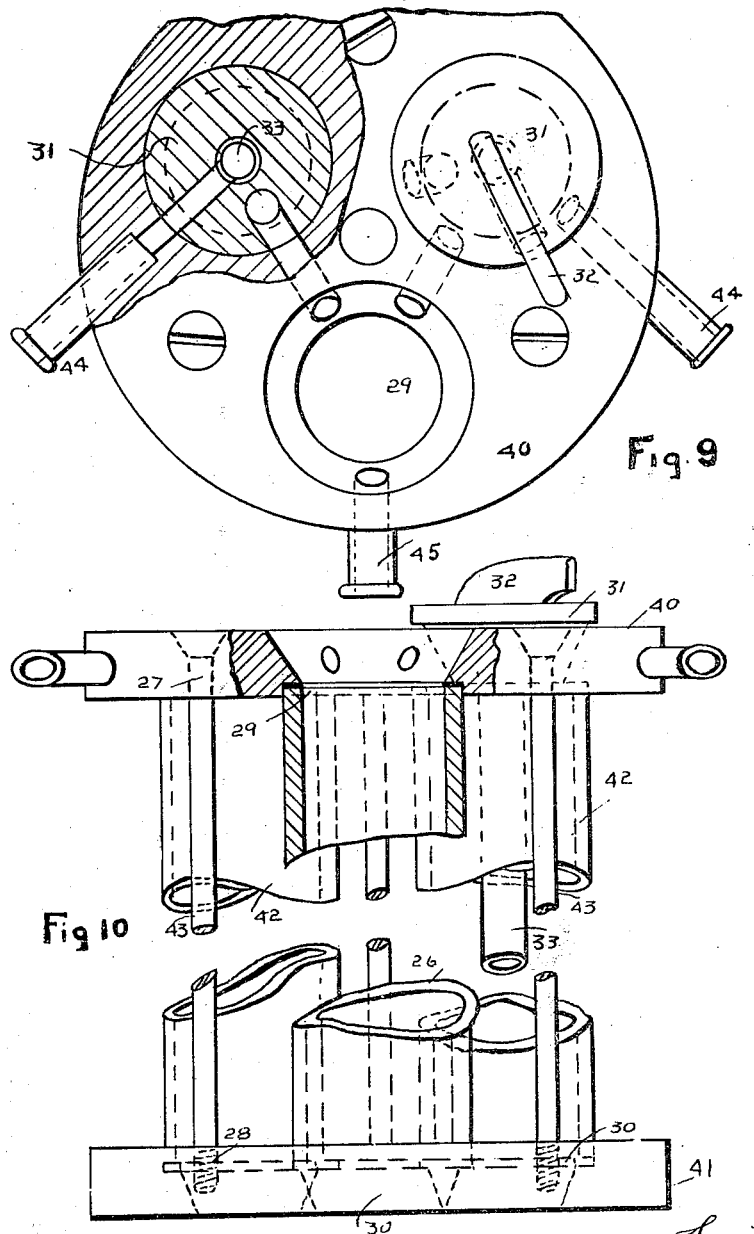

1,504,027

UNITED STATES PATENT OFFICE.

WALTER H. DELAHAYE AND EDOUARD VANDECAN, OF OTTAWA, ONTARIO, CANADA, ASSIGNORS TO THE NATIONAL MANUFACTURING COMPANY, LIMITED, OF BROCKVILLE, ONTARIO, CANADA, AN INCORPORATED COMPANY.

HAND MILKING MACHINE.

Application filed July 3, 1922. Serial No. 572,652.

*To all whom it may concern:*

Be it known that we, WALTER HAMILTON DELAHAYE and EDOUARD VANDECAN, British subjects, residing at Ottawa, in the county of Carleton, Province of Ontario, Canada, have invented a new and useful Improvement in Hand Milking Machines, of which the following is a specification.

The invention comprises a hand pump mounted on a wheeled frame, which also supports a milk receiving unit, and the ordinary milk can. The specific points of novelty are found in the disposition of the pump and in the spring used to render the operation easier.

The milk receiving unit possesses points of novelty in its construction such as individual transparent milk chambers and a transparent milk trap to prevent the milk reaching the pump.

The whole construction is clearly shown in the drawings in which:

Fig. 1 is a front view of the assembled machine.

Fig. 2 is a side view of the milker.

Fig. 3 is a view of the plug valve used.

Fig. 4 is a top view of the milk receiving unit support.

Fig. 5 shows the friction sliding joint for the valve rod.

Fig. 6 is a top view of the pump lever.

Fig. 7 is a view showing the attachment of the fixed arms to the frame.

Fig. 8 is a view of the fulcrum spools.

Figs. 9 and 10 show the construction of the milk receiving unit being respectively a top view, side elevation partly in sections.

Referring to the drawings:

The whole device is supported on a wheeled frame made up from tubular members as follows: Rising from the axle, 1, are side uprights, 2, which are connected by a cross bar, 3. About the middle of the uprights, 2, horizontal members, 4, extend rearwardly and are joined by a cross bar, 5. Extending for a short distance forwardly of the axle and rearwardly therefrom is a central tube, 6, from which, at a point to the rear of cross bar, 5, rises the upright, 7, which is braced to the cross bar, 5, by the short section, 8. The side members, 4, are continued to form the handles, 9. Slidingly mounted in the upright, 7, is a stop rod, 57, which is designed to engage the end of the stall floor to prevent the wheel dropping into the gutter. The whole frame is put together by means of the usual tees and elbows commonly used in such work and constitutes a light and rigid frame for the whole device. Fig. 2 shows the position of the can used on the truck.

The pump cylinder, 10, is articulated on the cross bar, 5, by means of lugs, 11, one on each side of the fitting connecting pipe, 8, thereto. The pump is an ordinary single acting suction pump giving suction on the down stroke of the piston and a certain amount of compression on the upward stroke. The piston is of the usual spring extended leather washer type and further details are deemed unnecessary. The piston rod, 110, is connected by means of a T piece integral therewith to the bifurcated ends of lever, 12, which is formed of sheet material as more fully disclosed in Fig. 6. Extending rearwardly from the plate section of the lever are projections, 13, provided with fulcrum grooves, 14, and spring retaining notches, 15. An upright handle, 16, is riveted and braced thereto. Secured on the rear member, 6, is a block, 17, and fastened in grooves in the block are rigid members, 18, corresponding to and opposing the projections, 13. The members, 13, are mounted thereon by means of fulcrum spools, 19, and held in place by means of caliper springs, 20, bearing in the notches, 15, and similar notches in the rigid members, 18.

The operation of the pump is self evident, a push on the handle aided by the springs causes a downward stroke and creates a suction, while a pull against the spring gives an upward or compression stroke.

From this it will be seen that the stroke requiring the greatest power, the suction stroke, is aided by the springs and the stroke doing less work is synchronized with the compression of the springs.

Turning now to the milk receiving chamber. This is adjustably supported by two cross bars, 21, having circular sections, 22, at the centre and ends, 23, slidably embracing the side uprights, 2. The two bars are held in proper spaced relation by members, 24, and the top circle is notched, as at 25, to locate and support the milk chamber by means of the nipples extending from the top plate.

Clamped between the two plates, 40 and 41, are three glasses, two of which (42) are of the same size and a third, hereinafter referred to as the trap, 26, may be of the same size or of a different size. These three tubes are held by clamping rods, 43, passing through holes, 27, in plate, 40, and screwing into holes, 28, in plate, 41. The ends of all three tubes are held in recessed apertures, 29 and 30, in the plates and are provided with gaskets. The apertures, 30, in the lower plate, 41, are as nearly as possible the full size of the bore of the tubes and similarly the holes, 29, in the top plate, 40, are as large as possible and are tapered as shown. Each of these holes is closed by a tapered plug, 31, the plugs closing the tubes, 42, being used as valves and for that reason being provided with handles, 32, and the required ports. Each plug is provided with a tube, 33, leading to the bottom of the glasses and the top plate, 40, is provided with the following passages: From the milk line nipples, 44, to the seat over tubes, 42, from the seats for the tubes, 42, to that for tube, 26, from the seat for 26, to the pump line nipple, 45, which is connected to the pump by the tube, 34. The plugs used in the tube, 42, have passages leading to the tubes, 33, and registering with the milk line passages when the horizontal port of the right-angled passage, 35, registers with the port to the trap tube, 26. The plug used in the trap may be without a handle and has a passage from a recess registering simultaneously with both the ports from the tubes, 42, to its central tube, 33, and at the same time its right-angled passage connects the interior of the trap to the pump line. Alternatively the plug may have a handle and a through port connecting the pump line directly with the tubes, 42, in addition to the other passages so that the trap may be cut off. The circuit for the suction is through milk nipple, 44, to seat for tubes, 42, through port and tube, 33, to bottom of tube, 42, through right angled port, 35 to seat for the tube, 42, then through passage to seat for tube, 26, to centre of plug used in the trap and down through its tube, 33, through its right-angled passage, 35, which registers with the pump nipple.

The bottom apertures are all closed by means of a single mechanically operated valve, composed of a metal disc, 46, and a resilient facing disc, 47, supported by a rod, 48. The rod passes through central holes in plates, 40 and 41, and is slotted to receive an operating lever to be described later. Removably suspended from the plate, 41, by bayonet joints or the like is a strainer, 49.

Returning now to the frame it will be seen that a hollow rod, 50, is articulated to the end of lever, 12, and has a telescoping section, 51, sliding therein, being frictionally clamped by means of packing and a thumb nut, 52. A brace, 53, riveted to the circular parts of the supporting bars, 21, presents a pivot, 54, and at the upper end of the rod, 51, is pivoted a short lever, 55. The free end of the lever is adapted to be received in the slot of rod, 48, and it may then be slipped onto the pivot on the brace, 53, being retained by the angular thrust of the compound rod, 50 and 51, or by a pin through the pivot, 54. The upward stroke of the rod, 48, will be limited by the valve, 46 and 47, and the downward stroke may be limited by any form of engaging stops on the lever, 55, and the brace, 53. When a movable plug is provided in the tube, 26, some projection may be so placed as to further limit the stroke of the lever and valve. A vacuum gauge, 56, is mounted on the bar, 3, and connected to the plug valve in the trap, 26, by means of a flexible tube.

The teat cups used are of any known type, having a single wall and the claw may be of any known design. But preferably the claw is provided with means for so holding the rubbers so as to close the passage and from which the tubes may be removed after the teat cup has been applied.

The operation of the whole device should be apparent from the above description but briefly it is as follows:

The tubes are held closed in any well known manner and the milk chamber is exhausted by taking a stroke of the pump and locking same if the springs are insufficient to maintain a proper vacuum. One set of teat cups is then applied. Another stroke of the pump will probably be necessary when applying the second set. The pump is then operated so the milk is drawn into the tubes, 42, but no milk is drawn into the trap, the level in the glasses being carefully watched. However, should milk be drawn into the trap it will be emptied out into the strainer on the reverse stroke. The use of the friction device in rod 50—51 gives the valve a full stroke for a short pumping stroke and still allows a longer stroke of the pump without affecting the valve operation. It also allows the milk chamber to be moved to any position, as the rod may be quickly adjusted to suit the change.

As explained above the down stroke of the pump exhausts the milk chamber, having caused the valve to close through rod 50—51 and lever, 55. It is evident that the reverse stroke will force the milk into the strainer and to the can, as the valve is not only worked mechanically but is affected by the compression and by its own weight.

It will be noticed that all parts of the milk chamber, strainer, valves and plugs may be removed from the operative position and the tubes, 42 and 26, may be washed in situ. However, when desired the whole may be bodily lifted out.

The above description is only of one preferred from and it not to be regarded as limiting the construction. Various details both in regard to mounting the pump and the construction of the milk chamber may be made and it is intended to cover all such modification as may be held to come within the scope of the appended claims.

What we do claim for our invention is:

1. In a milking machine and in combination with a support, a milk receiving chamber and a hand pump mounted on said support inlet passages for said receiver and a discharge valve therefor, a hand lever operating said pump and means for mechanically operating said discharge valve therefrom.

2. In a milking machine, a wheeled support a hand pump mounted thereon, the operation mechanism therefor including a spring pressed lever a milk receiver having a discharge valve mounted on said support, above said lever and means including a telescoping rod and friction coupling to mechanically operate said discharge valve by the movement of said lever to synchronize the operation of the valve with the operation of the pump.

3. In a milking machine and in combination with lever operated hand pump on a wheeled support a milk receiver mounted on said support, said receiver consisting of a pair of milk receiving chambers pneumatically connected to a common trap chamber, all of said chambers having a common discharge valve, and means for operating said valve from the said operating lever of the pump.

4. In a milking machine and in combination with a wheeled support mounting a hand pump, said pump having a spring operated lever included in its operating mechanism, a milk receiver adjustably mounted on said support, said receiver having a plurality of milk receiving chambers, a common exhaust valve for said chambers and means for operating said valve from said spring operated lever, said means including a friction coupling to allow for the adjustment of said milk receiver and for variation in the length of the stroke of said spring operated lever.

5. In a milking machine, means to support a milk can, a milk receiver and a hand pump, said receiver consisting of a plurality of transparent chambers one for each cow to be milked, and another connected in series with said chambers, a common valve for the discharge openings of said chambers, and operating means for said valve, said means including a rod, connected at one end to a lever which operates the pump and at the other end to a lever mounted on the milk receiver and engaging the valve, said rod being composed of telescoping sections and a friction clutch to govern said telescoping action.

WALTER H. DELAHAYE.
EDOUARD VANDECAN.